July 21, 1959 P. A. HUSMAN 2,896,192

DATA PROCESSING APPARATUS

Filed Aug. 9, 1954

INVENTOR
PAUL A. HUSMAN
BY Joseph Weingarten
ATTORNEY

United States Patent Office 2,896,192

Patented July 21, 1959

2,896,192

DATA PROCESSING APPARATUS

Paul A. Husman, Natick, Mass., assignor to Laboratory For Electronics, Inc., Boston, Mass., a corporation of Delaware Application August 9, 1954, Serial No. 448,590

9 Claims. (Cl. 340—174)

Figure 1:
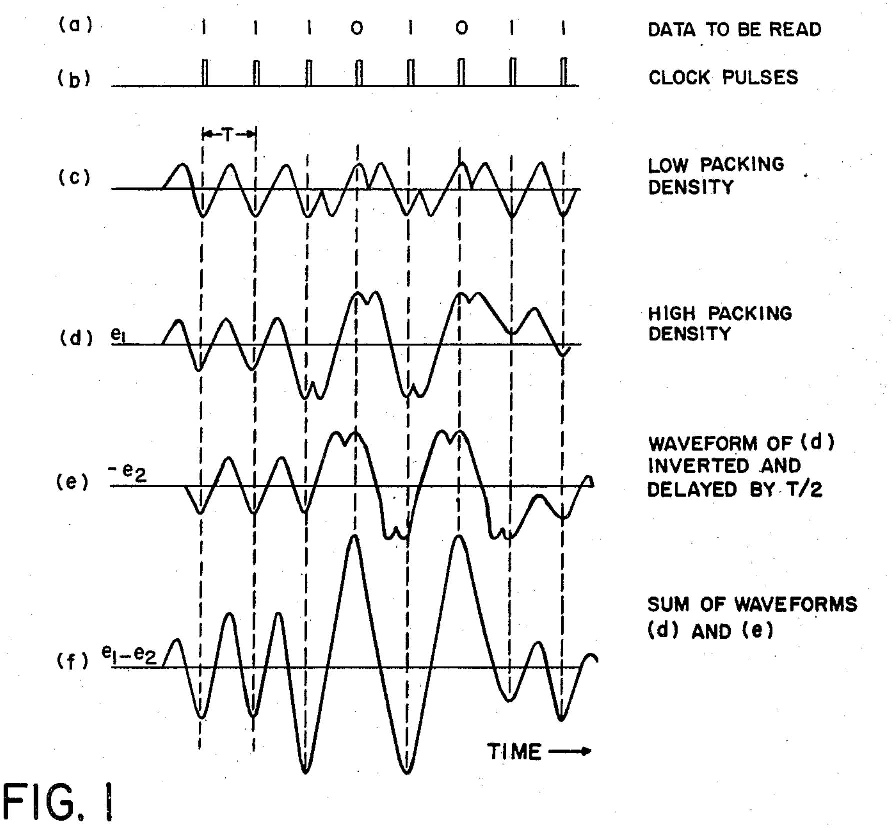

The present invention relates in general to the interpretation of electrical data and more particularly to electrical apparatus capable of measurably improving the accuracy with which digital data may be read from a magnetic storage medium.

Fundamentally it is the function of a magnetically stored binary digital data reading system to examine each storage cell on the surface of the record medium at a time determined by system synchronization clock pulses and to indicate whether a "zero" or "one" is stored in that position. It should be noted that there are various schemes by which the digital data may be stored upon a magnetic medium, such as a tape or drum. An early approach was known as the "non-return-to-zero" system, hereinafter referred to as the NRZ system. In this arrangement the state of the magnetic medium is changed only when the binary digit to be stored is different from the binary digit stored in the preceding cell on the surface of the medium.

When reading in an NRZ system, the relative motion between magnetic medium and pick-up head results in the latter sensing the changes in flux stored on the medium surface. Through the use of coincidence gates, at each clock pulse period, the output voltage of a flip-flop set by the reading head is sampled, thereby providing information concerning the magnetic state of the particular storage cell. In this system the minimum spacing between storage cells is severely limited by the spreading of the flux back into previously recorded digit cells when a change in digits is recorded in the magnetic medium.

In order to lessen this limitation, the return-to-zero system (hereinafter referred to as the RZ system) is frequently used. In the RZ system data is stored by causing a pulse of current to flow in the recording head coincident with its passage over a storage cell. The polarity of the current pulse determines whether the stored digit is a "one" or a "zero." The state of the magnetic medium is then changed from its unmagnetized state by the current pulse. Because of spread of flux in the magnetic medium, a rectangular pulse of current through the recording head will leave a flux distribution in the storage cell which appears as a rounded pulse when plotted against the distance from the leading edge of the cell.

In an RZ reading system, the reading head has induced in it a voltage proportional to the rate of change of flux as the magnetic medium moves relative to the reading head. Thus as a cell moves across the head, the output voltage rises to a maximum, the polarity being dependent on whether the stored binary digit was a "zero" or "one." It then returns to zero, rises to a maximum of opposite polarity, and finally comes back to zero.

When the cells are sufficiently far apart so that the voltages read out can always complete the aforementioned cycle, the stored binary data is said to be of low packing density. The induced voltage may be sampled at a time determined by a clock pulse, and from the polarity of the sample of the voltage the binary digit stored in the cell may readily be determined.

It is highly desirable, of course, for maximum utilization of a given magnetic storage medium to move the storage cells closer together, that is to say, to increase the system packing density. But as these cells are more closely packed, the voltage from the reading head does not always return to zero between storage cells.

The output voltage evidently has periodic components having the same wavelength as the flux density waveform which passes across the reading head. If adjacent cells have the same stored binary digit, the fundamental component has a wavelength which is half that of the case where adjacent cells have different stored binary digits.

Reading head voltage is a function of recorded wavelength and decreases with decreasing wavelength at high packing density because of gap loss due to the finite slit in the reading head, spacing loss due to imperfect magnetic contact between the reading head and medium, and other losses. Thus the voltage derived from a magnetically stored digital signal will be greater when reading a cell containing a stored binary digit different from that stored in the preceding cell, than if the preceding cell had a like digit stored. It is thus possible for a combination of stored digits to occur such that the read voltage does not cross the zero line between digits and consequently the sampled voltage would erroneously be of a polarity such that the digit indicated in the output was different from the stored digit.

The present invention contemplates and has as a primary object the provision of electronic apparatus for materially improving the reliability with which magnetically stored digital data may read, particularly under conditions of high packing density. Conversely, through the utilization of the inventive concepts herein described, higher data packing density may be used in available magnetic recording systems without deterioration of dependable standards already established for such apparatus.

It is another object of this invention to provide means for accurately reading magnetically stored binary digital data through separate channels for each of the two possible binary digits.

Figure 2:
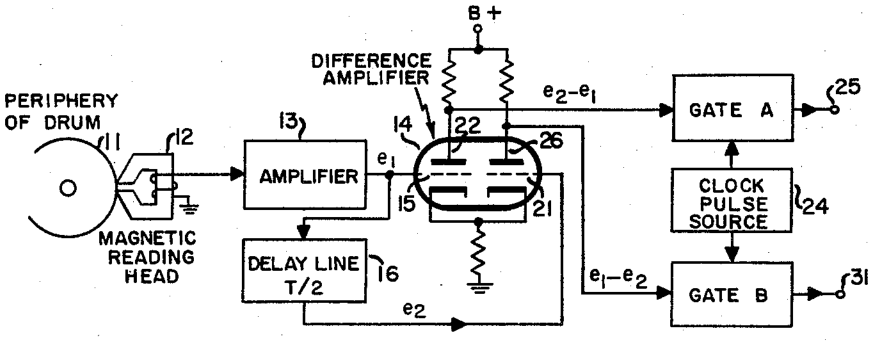

These and other objects and advantages of the present invention will become more apparent from the following detailed specification with reference to the accompanying drawing, in which:

Fig. 1(*a*)–(*f*) shows a group of waveforms pertinent to understanding the advantages and principles of the system operation plotted as a function of time together with the binary digit corresponding to a particular time; and Fig. 2 is a schematic circuit diagram illustrative of a preferred embodiment of this invention.

Referring first to Fig. 1(*a*) there is indicated an arbitrary array of binary digits to be read at the time corresponding to the system clock pulses shown in Fig. 1(*b*) directly below. It should be observed that no particular significance is attached to the binary data selected other than certain digit sequences therein will facilitate explanation of the problem and its novel solution herein.

In Fig. 1(*c*) the voltage output of a magnetic reading head as it would appear for a low packing density with an RZ recording system is indicated. This waveform serves to illustrate the fact that in an RZ recording system under conditions of low packing density, the waveform for each digit is unambiguously discernible. Thus observe that for the first three digits, namely, "one," "one," "one," a smooth progression of waves results. The fourth digit, which is a "zero," is recorded with similar waveshape, but of opposite polarity. The fifth digit, again a "one," records as did the prior "one's," and so on. For purposes of reading the signal waveform shown in Fig. 1(*c*), the sampling occurs during the intervals in which the clock pulses, Fig. 1(*b*), are generated and the timing relationship is such that when the sampled voltage is of negative polarity, a "one" is read; when positive, a "zero" is read. Comparison of the waveforms shown in Figs. 1(*b*) and (*c*), thus indicates that no unusual problems appear, and unambiguous interpretation of the stored data is readily accomplished.

In Fig. 1(*d*) the read voltage waveform for the same set of binary digits is shown as it would appear under conditions of high packing density in the same RZ recording system. To facilitate comparison of the results, Fig. 1(*d*) has been plotted to the same physical scale as Fig. 1(*c*) but since high packing density is represented, the waveform Fig. 1(*d*) may be thought of as plotted against an expanded time scale. As earlier noted under conditions of high packing density it is not always possible for the waveform to return to zero, particularly in instances where a digit change occurs. Thus note that in the case of the third "one" in Fig. 1(*d*), the waveform does not return to base line before the oppositely phased signal of the following "zero" appears therein. This effect is again observed when this "zero" is followed by a "one" which is, in turn, followed by a "zero." Of particular interest therein is the effect observed when the sixth digit which is a "zero" is followed by two "one's." Note that if the waveform of Fig. 1(*d*) were sampled by conventional techniques during clock pulse intervals as described above in connection with Fig. 1(*c*), the seventh digit will erroneously be read as a "zero" instead of a "one." In other words, as it is attempted to record a greater quantity of data in a given area of the magnetic medium, changes in waveform tend to obscure the stored data, and in fact, result in inaccuracies incapable of being tolerated in most digital applications.

In order to demonstrate the principles of this invention in graphical terms, reference is now made to Fig. 1(*e*) wherein the waveform already shown in Fig. 1(*d*) has been inverted and delayed by a time interval T/2, that is, one-half the interval between clock pulses. The waveforms in Figs. 1(*d*) and (*e*) are then summed to produce the waveform of Fig. 1(*f*) and it will now be observed that when the latter waveform is sampled at times coincident with the clock pulses shown in Fig. 1(*b*), the seventh digit may be correctly read as a "one." It is evident from the drawing that clarification of the seventh digit in this manner did not adversely effect readability of the remaining digits.

In Fig. 2 there is schematically illustrated apparatus for realizing the advantages noted above in connection with the composite waveform Fig. 1(*f*). Specifically data stored in an RZ system on the periphery of magnetic drum 11 is read by the magnetic reading head 12 whose output is applied to amplifier 13. The output $e_1$ of amplifier 13 is applied to one grid 15 of differential amplifier 14. The output $e_1$ of the amplifier 13 is simultaneously applied to a signal delay circuit, preferably in the form of a delay line 16, whose output $e_2$ is, in turn, applied to the other grid 21 of difference amplifier 14. The delay time introduced by delay line 16 is equal to one-half the interval between successive clock pulses emitted from clock pulse source 24. The output appearing at plate 22 is the difference $(e_2-e_1)$, and is applied to coincidence gate A together with clock pulses from clock pulse source 24. Timing is such that clock pulses occur substantially in coincidence with the positive and negative peaks of the differential amplifier output waveform, as shown in Fig. 1. If the polarity $(e_2-e_1)$ is positive at a time that a clock pulse is fed into gate A, a pulse appears at output terminal 25. This corresponds to the binary digit "one" having been read. If the polarity of $(e_2-e_1)$ is negative when the clock pulse is fed into gate A, there will be no pulse at the output terminal 25.

The output of the second plate 26 of the difference amplifier 14 is a voltage $(e_1-e_2)$, and is coupled to gate B together with clock pulses from the clock pulse source 24. If the polarity of $(e_1-e_2)$ is positive at the time a clock pulse is applied to gate B, a pulse appears at the output terminal 31 corresponding to a binary digit "zero" having been read. On the other hand, if the polarity of $(e_1-e_2)$ is negative during an interval that a clock pulse is applied to gate B, no output pulse will appear at terminal 31.

The effect of the circuit shown in Fig. 2 then is to perform the operation shown graphically in the derivation of Fig. 1(*f*), that is to say, the single voltage output of the reading head 12 is simultaneously applied to two channels, one of which is directly coupled to a differencing circuit while the other is coupled thereto after a time delay of one-half the clock pulse period. The difference between delayed and undelayed waveforms corresponds to that shown in Fig. 1(*f*) and serves to completely eliminate the ambiguity earlier shown to exist in the waveform Fig. 1(*d*) which is the unprocessed output of the reading head 12 in Fig. 2 under conditions of high packing density. Through the use of both differential amplifier outputs, and two coincidence gates, "zero" and "one" digit states are both indicated by pulses, rather than by a pulse for one state and the absence of a pulse for the other.

An important feature to observe in connection with the present invention is the fact that although novel circuit means are provided for processing the output of the magnetic pick-up head 12, no changes whatsoever are required in the magnetic recording-read-out system employed to achieve the advantages herein noted. In other words, drum 11 and pick-up head 12 and the recording head (not shown) may be that of any conventional "non-contact" or "in-contact" drum recording arrangement, or any of the customary and commercially available tape recording and reading systems.

As a practical example of the benefits available, test results with an existing "in-contact" magnetic drum recorder may be considered. Using an iron-oxide impregnated surface, a packing density of 300 digits per inch was found to be the maximum, consistent with established reliability standards, for conventional reading techniques. By application of the principles of this invention, and without change in drum, recording, or read-out heads, a packing density of 880 digits per inch could be read with equal reliability. Thus, with respect to existing magnetic digital recording arrangements, this invention is then effective to permit relatively large increases in packing density, and consequently corresponding increases in the effectiveness of the drum without sacrifice of system dependability.

In view of the fact that numerous modifications and departures may now be made by those skilled in this electrical art, the invention herein is to be construed as limited only by the spirit and scope of the appended claims.

What is claimed is:

1. In apparatus for reading stored digital data having means for providing a signal output characteristic of said stored data, means for interpreting said signal output comprising, a source of substantially periodic timing signals, means for deriving first and second signals from said signal output spaced in time by substantially one-half the period of said timing signals, means for linearly combining said time spaced signals to provide a data signal, and means for providing said data signal as an output during time intervals related to said timing signals.

2. In a device for reading magnetically stored digital data having a scanning head for providing a signal output characteristic of said stored data, means for interpreting said signal output comprising a source of substantially periodic timing signals, means for delaying said signal output by substantially one-half the period of said timing signal, means for linearly combining said signal output differentially with said delayed signal output to derive a data signal, and means for providing said data signal during time intervals related to said timing signals.

3. Apparatus for interpreting the signal output of a magnetic reading head when reading magnetically stored digital data comprising, a source of timing pulses, means for deriving a signal proportional to the difference between said signal output and said signal output delayed in time by an interval equal to substantially one-half the time interval between said timing pulses, and gating means for providing as an output said difference signal only during intervals coincident with said timing pulses.

4. In a return-to-zero magnetic digital data storage system having a magnetic reading head for providing an output signal whose waveform is characteristic of said stored digital data, means for interpreting said output signal waveform comprising, a source of timing pulses, means for delaying said output signal for a period equal to one-half the time interval between said timing pulses, means for linearly combining said output signal differentially with said delayed output signal to provide a data signal, means for sampling said data signal at times coincident with said timing pulses, and means for sensing the polarity of said data signal during sampling periods.

5. In a return-to-zero digital data magnetic storage system, a magnetic medium and a magnetic reading head for providing an output potential waveform characteristic of the digital data stored on said medium, a source of timing pulses, a differential amplifier having first and second inputs, means for applying said potential waveform to said first input of said differential amplifier, a delay circuit having a delay period substantially one-half the time interval between said timing pulses, means for simultaneously applying said potential waveform to said delay circuit, means coupling the output of said delay circuit to said second input of said differential amplifier, and a coincidence gating circuit activated by said timing pulses and the output of said differential amplifier for yielding the digital data output of said system.

6. In a return-to-zero digital data magnetic storage system, a magnetic medium and a magnetic reading head for providing an output potential waveform characteristic of the digital data magnetically stored in said medium, a differential amplifier having fisrt and second inputs and first and second outputs, said first output being proportional to the difference between signals applied to said first and second differential amplifier inputs and said second output being proportional to the difference between signals applied to said second and first differential amplifier inputs, means coupling said reading head output potential waveform to said first differential amplifier input, a source of timing pulses having a period related to the rate at which said digital data is read from said magnetic storage medium, a signal delay circuit for introducing a time delay substantially equal to one-half the interval between said timing pulses, means coupling said reading head output waveform to said second differential amplifier input through said delay circuit, first and second coincidence gate circuits respectively energized from said first and second differential amplifier outputs, and means for applying said timing pulses simultaneously to said first and second coincidence gates, said gates being operative to provide as outputs signals from said first and second differential amplifier outputs respectively during the application of said timing pulses.

7. Apparatus as in claim 6 wherein said timing pulses are applied to said first and second coincidence gates substantially during amplitude peaks of said first and second differential outputs.

8. Apparatus for interrupting an output signal characteristic of stored digital data comprising, a source of timing pulses, means for deriving a data signal by linearly combining said output signal and said output signal delayed in time by substantially one-half the time interval between said timing pulses, and gating means for providing said data signal as an output during intervals determined by said timing pulses.

9. Apparatus for interpreting a signal characteristic of stored digital data independently of whether or not said characteristic signal returns to zero intermediate stored digits comprising, a source of substantially periodic timing pulses, means for deriving first and second signals from said characteristic signal time spaced by substantially one-half the period of said timing pulses, and means for linearly combining said time spaced signals to provide a differential data output signal during intervals determined by said timing pulses.

References Cited in the file of this patent

UNITED STATES PATENTS

| | | |
|---|---|---|
| 2,418,127 | Labin | Apr. 1, 1947 |
| 2,633,564 | Fleming | Mar. 31, 1953 |
| 2,679,551 | Newby | May 25, 1954 |
| 2,764,463 | Lubkin et al. | Sept. 25, 1956 |